US012559197B2

(12) United States Patent
Greven et al.

(10) Patent No.: US 12,559,197 B2
(45) Date of Patent: Feb. 24, 2026

(54) ELECTRIC BICYCLE DRIVE UNIT FASTENING ASSEMBLY

(71) Applicant: AMPRIO GMBH, Neuss (DE)

(72) Inventors: Dietmar Greven, Neuss (DE); Kai Venhoff, Neuss (DE)

(73) Assignee: SRAM, LLC, Chicago, IL (US)

( * ) Notice: Subject to any disclaimer, the term of this patent is extended or adjusted under 35 U.S.C. 154(b) by 549 days.

(21) Appl. No.: 18/043,393

(22) PCT Filed: Aug. 31, 2021

(86) PCT No.: PCT/EP2021/073973
§ 371 (c)(1),
(2) Date: Feb. 28, 2023

(87) PCT Pub. No.: WO2022/049055
PCT Pub. Date: Mar. 10, 2022

(65) Prior Publication Data
US 2023/0322327 A1 Oct. 12, 2023

(30) Foreign Application Priority Data
Sep. 1, 2020 (EP) .................................... 20193888

(51) Int. Cl.
B62M 6/55 (2010.01)
(52) U.S. Cl.
CPC .................................... B62M 6/55 (2013.01)
(58) Field of Classification Search
CPC . B62M 6/55; B62M 7/04; B62M 7/06; B62K 19/34; F16F 15/08; F16F 15/1205

USPC ...................................................... 180/206.4
See application file for complete search history.

(56) References Cited

U.S. PATENT DOCUMENTS

| 2017/0057582 | A1* | 3/2017 | Nishikawa | ............... | B62J 13/04 |
| 2017/0320533 | A1* | 11/2017 | Hayashi | ................. | B62K 21/20 |
| 2021/0269119 | A1* | 9/2021 | Boehnke | ................. | B62M 6/55 |

FOREIGN PATENT DOCUMENTS

| DE | 102016112778 | 1/2017 |
| DE | 102017201617 | 8/2018 |
| DE | 102020200385 | 7/2021 |
| EP | 3686102 | 7/2020 |

(Continued)

*Primary Examiner* — Christopher B Wehrly

(57) ABSTRACT

An electric bicycle drive unit mounting arrangement (50) by which a mid-motor electric drive unit (30) is floatingly attached to a drive receptacle (21) of a bicycle frame (20), wherein the drive receptacle (21) comprises two mutually parallel frame-fixed and vertical frame flanges (211, 212), wherein a drive unit housing (34) comprises two parallel and vertical housing flanges (41, 42), wherein one housing flange (41) is attached to one frame flange (211) and the other housing flange (42) is attached to the other frame flange (212), defining a flange pairing, respectively, and wherein both flange pairings comprise respectively at least one rubber mount (80) by means of which the frame flange (211, 212) is connected to the associated housing flange (41, 42) in a floating and rubber-elastic manner, so that the housing flanges (41, 42) do not bear directly against the corresponding frame flanges (211, 212) in each case, but are spaced apart from the corresponding frame flanges (211, 212) by a spacing gap (58) with a gap dimension X of at least 0.3 mm.

8 Claims, 2 Drawing Sheets

(56)  References Cited

FOREIGN PATENT DOCUMENTS

Figures 1, 2:
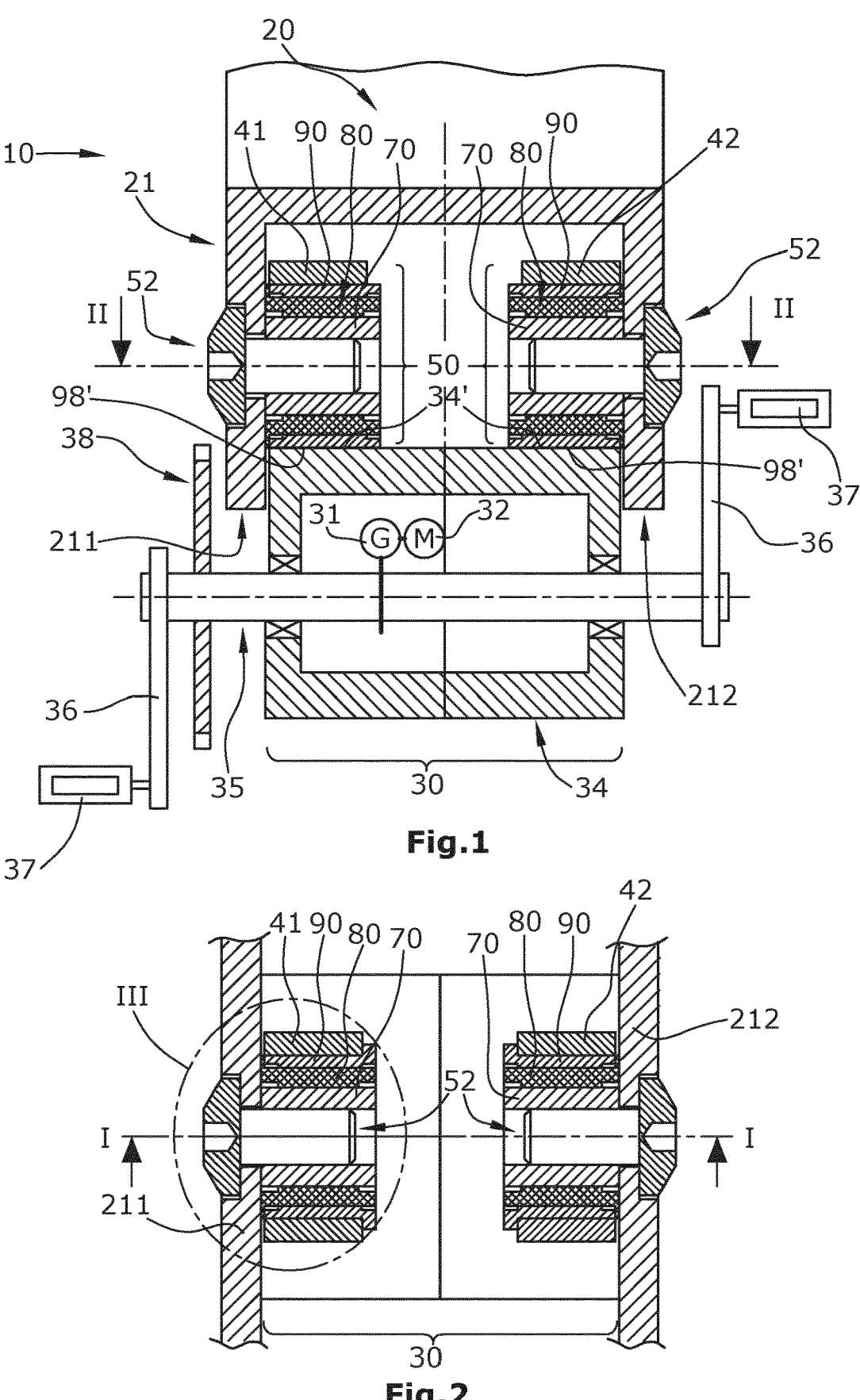

| | | |
|---|---|---|
| JP | 2016064721 | 4/2016 |
| WO | 2022043182 | 3/2022 |

* cited by examiner

ELECTRIC BICYCLE DRIVE UNIT
FASTENING ASSEMBLY

The invention refers to an electric bicycle drive unit mounting arrangement for attaching a mid-motor electric drive unit to a bicycle frame of an electric bicycle.

As used herein, an electric bicycle is understood to be any type of bicycle that comprises an assistive electric drive unit that provides a corresponding electric motor drive power to augment the human drive power input to the pedal crank by a rider, if desired. The present invention refers to a mounting arrangement for a so-called mid-motor drive unit which both rotatably supports the pedal crankshaft and comprises an output element, for example at least one sprocket, which drives a rear wheel of the electric bicycle. In a mid-motor drive unit, very high mechanical forces can be applied to the drive unit for a short time, which must be transmitted to the bicycle frame by the mounting arrangement.

From DE 10 2016 112 778 A1 and DE 10 2017 201 617 A1, mounting arrangements are known in which the bicycle frame comprises two parallel vertical frame flanges to which corresponding vertical housing flanges of the drive unit housing are fixed. Although this mounting arrangement comprises a high mechanical stability, the structure-borne noise of the drive unit housing is also transmitted to the bicycle frame. However, the acoustic properties of electric bicycle drive units are increasingly becoming the focus of end consumers' purchasing decisions.

Against this background, the object of the invention is to provide a strong electric bicycle drive unit mounting arrangement with improved acoustic properties.

This object is solved according to the present invention with an electric bicycle drive unit mounting arrangement with the features of claim 1.

By means of the electric bicycle drive unit mounting arrangement according to the present invention, the electric mid-motor drive unit is attached to a drive receptacle of a bicycle frame in a floating manner, thus completely avoiding a rigid connection between the drive unit housing and the bicycle frame. The bicycle frame drive receptacle comprises two frame-fixed and substantially vertical frame flanges parallel to each other. The drive unit housing comprises two mutually parallel and substantially vertical housing flanges which, when the drive unit is mounted, are respectively arranged distally or proximally, but preferably proximally, i.e. on the inside of the frame flanges. The left housing flange is attached to the left frame flange and the right housing flange is attached to the right frame flange. The drive unit is thus attached to the bicycle frame by two flange pairings, wherein each flange pairing comprises respectively a frame flange and the associated housing flange. The frame flange and/or the housing flange does not necessarily have to be defined by a bar standing vertically in a vertical plane, respectively. In particular, the housing flange can also be defined by a flange surface of the housing body which does not protrude vertically from the embedded part of the drive housing.

Both flange pairings comprise respectively at least one rubber mount, by means of which the frame flange is connected to the associated housing flange in a floating and rubber-elastic manner, so that the two housing flanges do not respectively rest directly against the corresponding frame flanges. A gap of at least 0.3 mm is defined between the housing flange and the frame flange, respectively. A rubber mount in the present case is not necessarily a mount made of rubber, but a rubber-elastic mount that provides a non-rigid and exclusively elastic connection that reduces the transmission of structure-borne noise to a relevant extent compared to a rigid connection.

Even with greater pedaling and drive forces, this ensures that no direct mechanical contact is established between the metal drive housing and the metal bicycle frame. In this way, the transmission of structure-borne noise from the drive housing to the bicycle frame is avoided. The structure-borne noise emissions are therefore considerably reduced in total in this way, so that as a result the acoustic properties of the electric bicycle are considerably improved.

Preferably, the rubber mount comprises an essentially ring-shaped or cylindrical rubber sleeve through which the pedaling and driving forces acting on the drive unit are transmitted essentially in the radial direction. Sufficient dimensioning of the rubber sleeve is easily achieved by appropriate design of the sleeve length, the sleeve diameter and the radial material thickness of the rubber sleeve. In this way, even very high forces can be transmitted without the drive unit moving significantly in relation to the bicycle frame. In particular, it can be reliably ensured in this way that the housing flange does not come into contact with the corresponding frame flange.

Preferably, the rubber sleeve is arranged in a substantially cylindrical ring-shaped gap between a stiff outer sleeve and a stiff inner sleeve. The combination of the rigid outer sleeve, the rubber sleeve and the rigid inner sleeve can be provided as a prefabricated component, wherein the rubber sleeve is connected with its outer circumferential surface to the inner circumferential surface of the outer sleeve and with its inner circumferential surface to the outer circumferential surface of the inner sleeve, preferably by material bonding, for example by vulcanisation. Alternatively and more preferably, a form-locking connection of the respective interface pairs can also be provided. The outer sleeve and/or the inner sleeve are preferably made of metal.

Preferably, the outer sleeve of the sleeve combination is seated in a through-hole of the housing flange. In this way, the sleeve combination can be inserted from a proximal direction, i.e. from the drive unit centre, distally into the respective through bore of the housing flange, so that it can be attached to the respective distal frame flange by a corresponding fastening means, for example a screw bolt.

Preferably, the inner sleeve is directly attached to the associated frame flange in a force-locking and/or form-locking manner. For example, the inner sleeve may comprise an internal thread into which an external thread of a screw bolt is screwed, which is inserted from the distal direction into a corresponding bolt opening of the frame flange. In this way, the drive unit can be mounted on the bicycle frame by exclusively screwing a screw bolt, for example a threaded screw, into the inner sleeve from the distal direction at both flange pairings respectively.

Preferably, the rubber sleeve comprises a spacing collar at its distal longitudinal end, which is arranged axially between the outer sleeve and the corresponding frame flange. The spacing collar ensures a constant minimum clearance between the frame flange and the corresponding housing flange, in relation to both flange pairings left and right. This ensures that even under heavy mechanical loads, no direct contact can occur between the frame flange and the associated housing flange, not even at certain points or for a short time.

Preferably, form-locking structures are provided at the inside of the outer sleeve and at the outside of the inner sleeve, which form-lock with complementary form-locking structures at the outside and the inside of the rubber sleeve. The rubber sleeve is thus virtually non-rotatably meshed with the inner sleeve and the outer sleeve via positive-locking structures. This is particularly important if the sleeve combination is fixed to the frame flange and/or the housing flange via a threaded connection through which a torque is exerted on the sleeve combination during assembly.

Preferably, the outer sleeve comprises an anti-rotation structure at its proximal longitudinal end, by means of which the outer sleeve is supported at the drive unit housing in a torque-proof manner. The anti-rotation structure is particularly necessary when the corresponding inner sleeve of the sleeve combination is mounted on the frame flange via a threaded bolt or screw. The anti-rotation structure prevents the sleeve combination from rotating together with the screw motion during assembly.

Figures 3, 4:
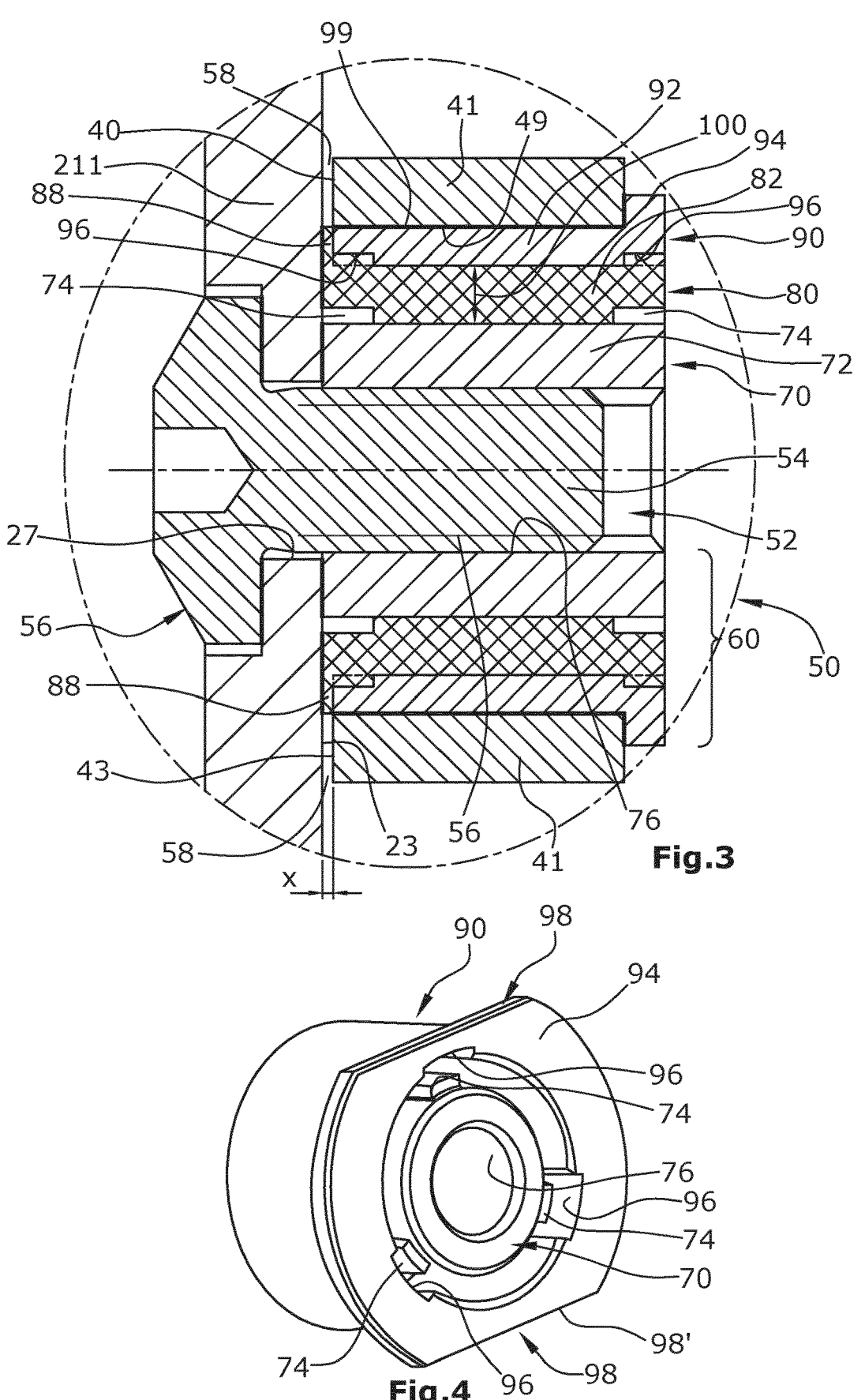

Hereinafter, an embodiment of the invention will be explained in more detail with reference to the drawings. They show:

FIG. 1 a vertical section I-I of an electric bicycle drive unit mounting arrangement with a mid-motor drive unit mounted to a bicycle frame side drive receptacle, FIG. 2 a horizontal section II-II of the electric bicycle drive unit mounting arrangement of FIG. 1, FIG. 3 is an enlarged view of the left-hand mounting arrangement III including a 3-part sleeve combination of FIG. 2, and FIG. 4 an outer sleeve and an inner sleeve of the sleeve combination of FIG. 3.

FIG. 1 shows a schematic vertical section of an electric bicycle 10 with a bicycle frame 20 and a mid-motor drive unit 30. In the present case, the drive unit 30 is designed to be purely assistive and supports the human drive power of a rider during riding.

In the present case, only a small part of a frame down tube and a drive receptacle 21 of the electric bicycle 10 are shown. The drive unit 30 comprises a closed drive unit housing 34 in which an electric drive motor 32 and a gearbox 31 are arranged. The gearbox 31 may have a fixed ratio, may be a gear shift gearbox or may be a continuously variable gearbox. Furthermore, a transverse output shaft 35 is beared in the drive unit housing 34, which in the present case also constitutes the bottom bracket bearing shaft. Generally, the output shaft and the bottom bracket bearing shaft can be provided separately from each other, e.g. arranged concentrically to each other. A left and a right pedal crank 36 are provided at the two longitudinal ends of the output shaft 35 and pedals 37 are provided at their ends respectively. An output element 38 configured as a gear wheel with more than 20 teeth is provided in a rotationally fixed manner at the output shaft 35, which drives a rear sprocket of a rear wheel of the bicycle 10 via a chain drive.

FIGS. 1-3 show two mounting arrangements 50 by which the drive unit 30 is floatingly attached to the drive receptacle 21 of the bicycle frame 20. The drive receptacle 21 comprises two frame flanges 211, 212 which are fixed to the frame and parallel to each other and which are respectively arranged in a vertical plane, so that a clamp-like receptacle which is open at the bottom and U-shaped in cross-section is defined. Parallel housing flanges 41, 42 of the drive housing 34, which are also arranged in a vertical plane, are attached to the two frame flanges 211, 212 and project vertically upwards from the closed drive housing 34. Generally, the housing flanges can alternatively be integrated into the actual drive housing 34.

The left frame flange 211 is rubber-elastically mounted to the left housing flange 41 by a rubber mount 80, and the right frame flange 212 is rubber-elastically mounted to the right housing flange 42 by an identical rubber mount 80. The two housing flanges 41,42 comprise respectively a cylindrical through bore 49 into which a sleeve combination 60 is inserted from the proximal direction. The sleeve combination 60 essentially comprises a rigid outer sleeve 90 defined by a metal sleeve body 92, a rigid inner sleeve 70 defined by a metal sleeve body 72, and a substantially cylindrical resilient rubber sleeve 82 defining the rubber mount 80. The rubber sleeve 82 fills a cylindrical ring-shaped gap 100 between the substantially cylindrical inner peripheral surface of the outer sleeve 90 and the substantially cylindrical outer peripheral surface of the inner sleeve 70. The rubber sleeve 82 is adhesively bonded or vulcanised to the outer sleeve 90 and the inner sleeve 70, respectively.

The outer sleeve outer body is configured substantially cylindrically at its outer circumferential surface 99, and is inserted with its outer circumferential surface 99 in a clamping manner into the cylindrical inner circumferential surface of the through bore 49.

FIG. 4 shows the sleeve combination 60 without the rubber sleeve 82. In FIG. 4 in particular, it is clearly visible that the outer sleeve 90 comprises on the outside at its proximal longitudinal end a stop ring flange 94 standing in a radial plane, which comprises an anti-rotation structure 98 by way of two chordal linear flattenings 98', the chord lines of which are parallel to each other. The outer sleeve 90, and thus the complete sleeve combination 60, is rotationally locked in the pre-assembled state at the drive unit 30 and in the final assembled state, since the flattening 98' establishes a rotational form-locking in cooperation with a corresponding flat counter-surface 34' of the drive unit housing 34, as can be seen for example in FIG. 1.

At the inside of the outer sleeve body 92, three form-locking pockets 96 are provided at the two longitudinal ends of the sleeve body 92, respectively, which correspond rotationally with similar form-locking ribs 74 at the outside of the inner sleeve body 72. The total of six form-locking pockets 96 and a total of six form-locking ribs 74 engage in a form-locking manner with corresponding complementary form-locking ribs and pockets of the rubber sleeve 82, so that in this way a reliably rotationally fixed connection between the inner sleeve 70 and the outer sleeve 90 is ensured even at high torques during assembly.

The inner sleeve 70 comprises an internal thread 76 on the inside into which an external thread 56 of a screw bolt 52 is screwed from proximal. The screw bolt 52 comprises a cylindrical threaded shank 54 and a bolt head 56. The associated frame flange 211,212 comprises a stepped through hole 27 through which the screw bolt 52 is inserted during assembly and screwed with its threaded shank 54 comprising the external thread 56 into the internal sleeve thread 76. In this way, the inner sleeve 70 is frictionally attached to the frame flange 211, 212.

As can be seen in particular in FIG. 3, the rubber sleeve 82 comprises at its distal longitudinal end a spacing collar 88 projecting radially outwards in a radial plane, which in the assembled state and only in the region of the outer sleeve 90 fills an axial gap 58 between the distal end face 43 of the outer sleeve 90 and the proximal flange face 23 of the associated frame flange 211,212. The spacing collar 88 thereby ensures a spacing gap x of approx. 1.0 mm between the housing flange 41,42 and the associated corresponding frame flange 211,212 in the static situation. Since at least one mounting arrangement 50 is provided both on the left and on the right, the drive unit 30 is centred in this way between the two frame flanges 211,212 in a floating manner.

In the dynamic situation, i.e. in operation, this always ensures a minimum distance gap which is always so large that the housing flanges 41,42 do not touch the associated frame flanges 211,212. This prevents the transmission of structure-borne noise from the drive unit housing 34 to the bicycle frame 20, so that the noise emissions caused by the drive unit 30 are reduced overall compared to a mounting arrangement with rigid connection of the drive unit to the bicycle frame.

The invention claimed is:

1. An electric bicycle drive unit mounting arrangement for an electric mid-motor drive unit comprising:

a bicycle frame including a drive receptacle including a first and second mutually parallel frame-fixed and vertical frame flanges, the mid-motor drive unit including a drive unit housing, the drive unit housing including a first and second mutually parallel and vertical housing flanges, wherein the first housing flange is attached to the first frame flange and the second housing flange is attached to the second frame flange, each defining a flange pairing, and wherein the flange pairings each have at least one rubber mount by which the frame flange is floatingly and elastically connected to the associated housing flange, so that the first and second housing flanges do not rest directly against the corresponding first and second frame flanges, but are spaced apart from the corresponding first and second frame flanges by a spacing gap of at least 0.3 mm, and each rubber mount is arranged in a substantially cylindrical annular gap between a rigid outer sleeve and a rigid inner sleeve.

2. The electric bicycle drive unit mounting arrangement of claim 1, wherein each rubber mount comprises a substantially annular or cylindrical rubber sleeve.

3. The electric bicycle drive unit mounting arrangement of claim 1, wherein the outer sleeve is seated in a through bore of the corresponding housing flange.

4. The electric bicycle drive unit mounting arrangement of claim 1, wherein the inner sleeve is rigidly attached directly to the corresponding frame flange in a force-locking and/or form-locking manner.

5. The electric bicycle drive unit mounting arrangement of claim 4, wherein the inner sleeve comprises an internal thread into which an external thread of a screw bolt is screwed, which is inserted from a distal direction into a bolt opening of the corresponding frame flange.

6. The electric bicycle drive unit mounting arrangement of claim 1, wherein each rubber sleeve comprises a spacing collar arranged axially between the outer sleeve and the corresponding frame flange.

7. The electric bicycle drive unit mounting arrangement of claim 1, wherein form-locking structures are provided at the inside of the outer sleeve and at the outside of the inner sleeve, which form-lockingly engage with complementary form-locking structures at the outside and the inside of each rubber sleeve.

8. The electric bicycle drive unit mounting arrangement of claim 1, wherein the outer sleeve comprises an anti-rotation structure at its proximal longitudinal end by which the outer sleeve is supported against rotation against the drive unit housing.

* * * * *